United States Patent

Isbell

[15] 3,643,891

[45] Feb. 22, 1972

[54] FILM TRANSPORT UNIT

[72] Inventor: Willard D. Isbell, San Diego, Calif.

[73] Assignee: Cubic Corporation, San Diego, Calif.

[22] Filed: Nov. 19, 1970

[21] Appl. No.: 90,982

[52] U.S. Cl..................................242/189, 242/205, 352/72
[51] Int. Cl. ..................B65h 59/38, G03b 1/04, G11b 15/32
[58] Field of Search..................242/186, 189, 190, 197–200, 242/205; 352/72–78

[56] References Cited

UNITED STATES PATENTS

| | | | |
|---|---|---|---|
| 2,005,404 | 6/1935 | Wittel | 242/200 |
| 2,568,339 | 9/1951 | Jacobson | 242/200 X |
| 3,157,880 | 11/1964 | Easterly et al. | 352/72 |
| 3,233,959 | 2/1966 | Gasser | 352/77 |

Primary Examiner—Leonard D. Christian
Attorney—Carl R. Brown

[57] ABSTRACT

A film transport unit for use as a microfilm camera, or the like, and having quick release means for attachment of a variety of standard film magazines. Film is drawn from the supply magazine and a supply loop is maintained by a drive which grips only the edges of the film, and is advanced incrementally through an exposure gate by an edge gripping capstan driven by a stepping motor. The film loading path is very simple and the guiding elements incorporate means for maintaining constantly precise film advance over long periods of use, without damaging stresses or wear on the film.

14 Claims, 12 Drawing Figures

INVENTOR.
WILLARD D. ISBELL

BY Carl R. Brown

ATTORNEY

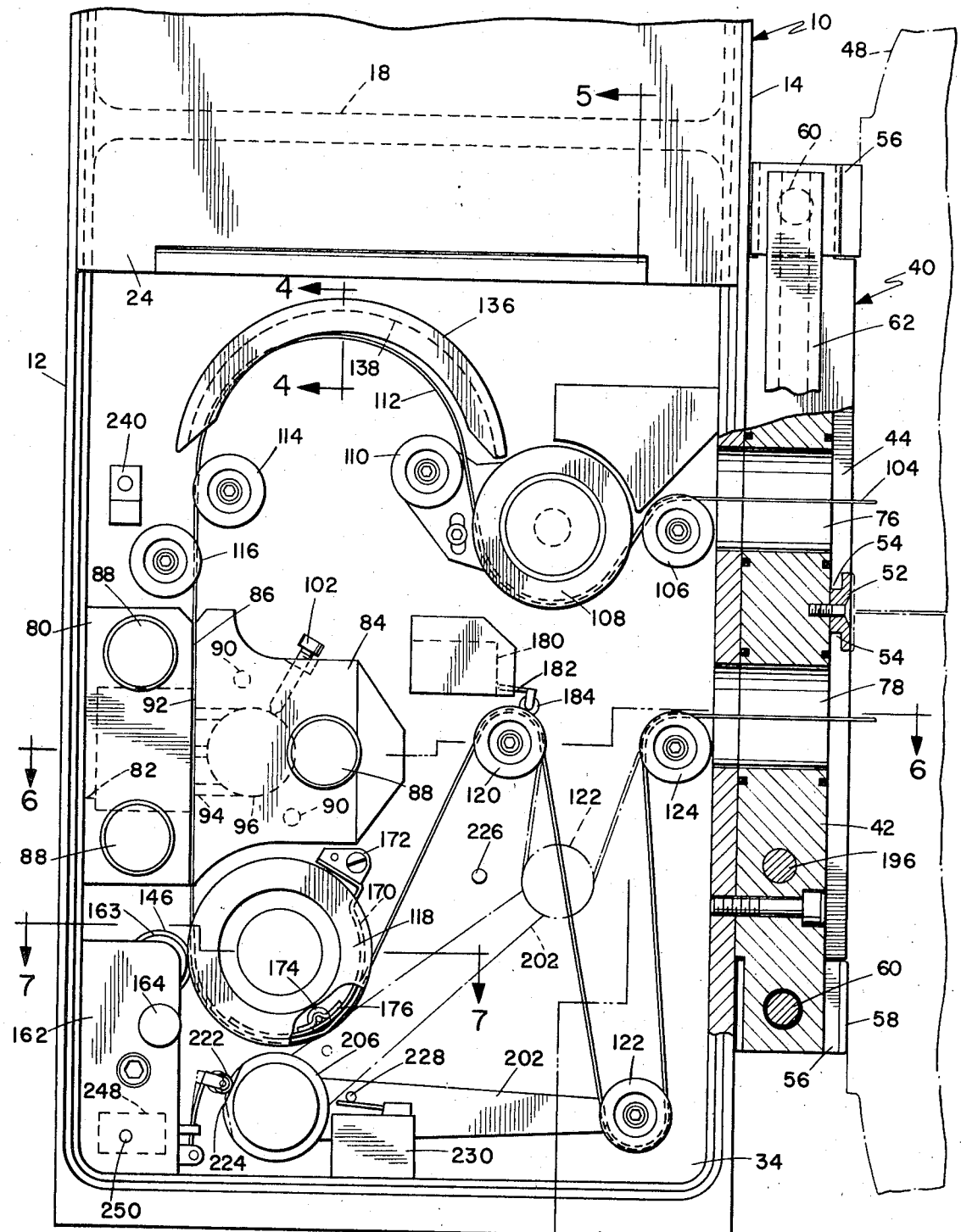
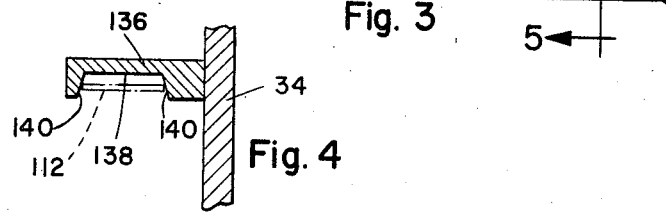

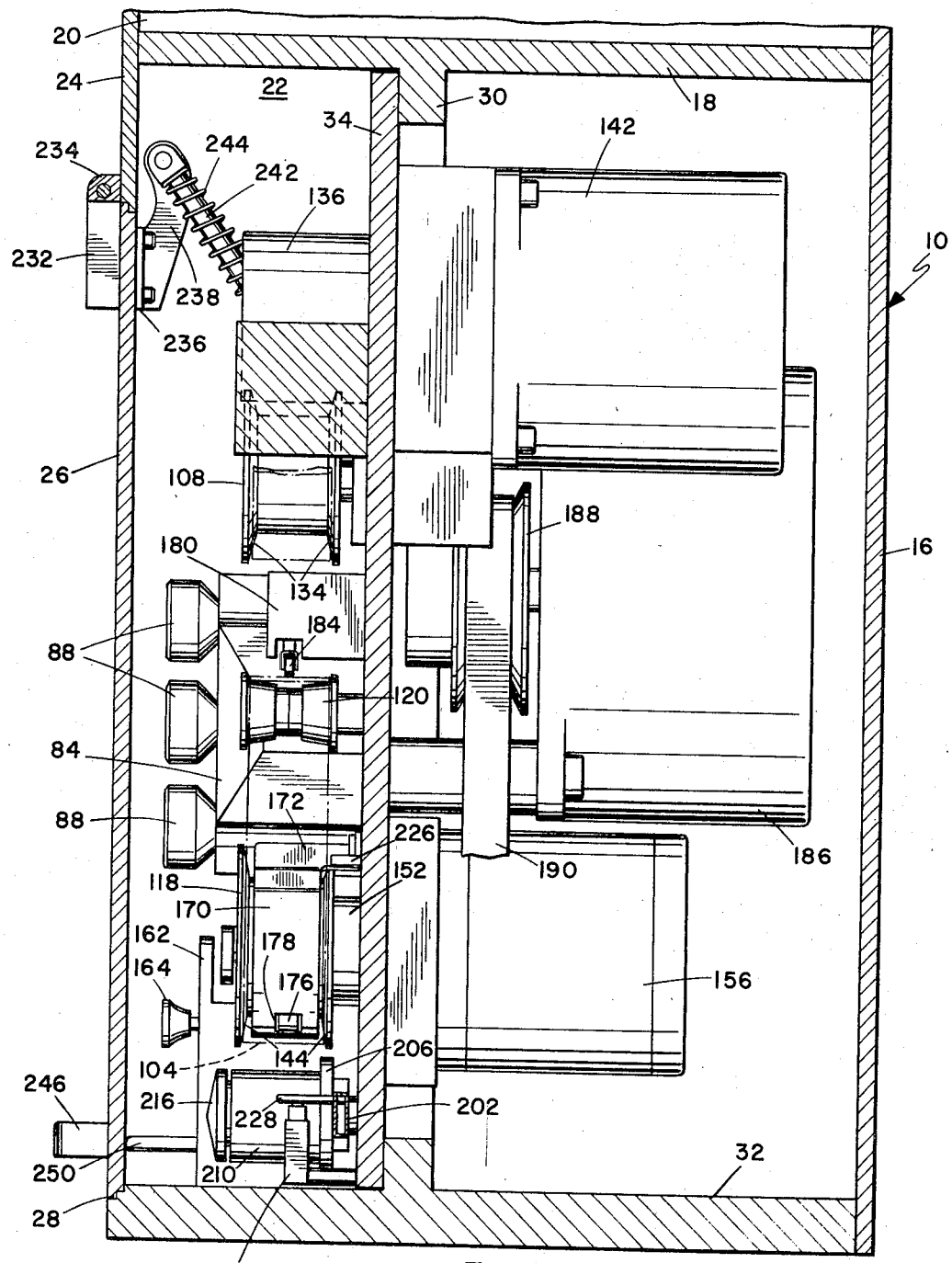

INVENTOR.
WILLARD D. ISBELL
BY Carl R. Brown
ATTORNEY

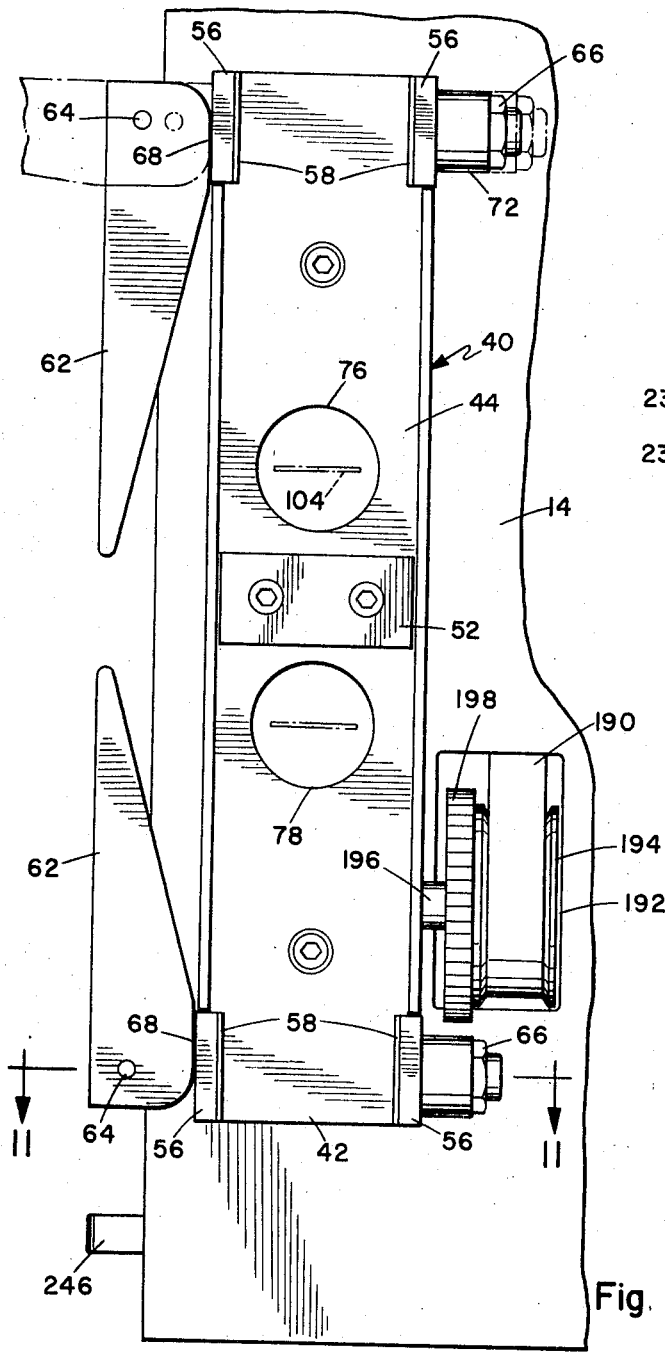
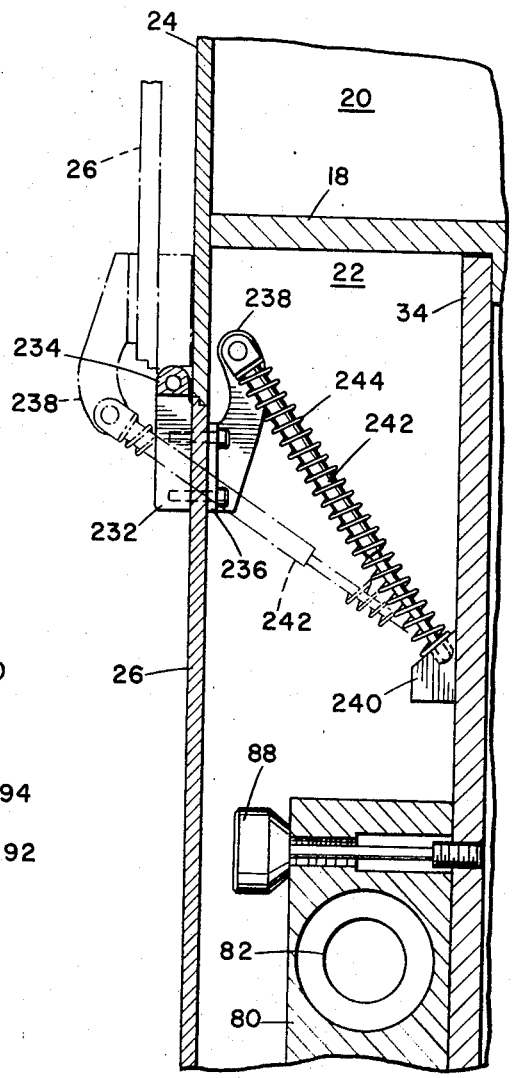
Fig. 10
Fig. 12
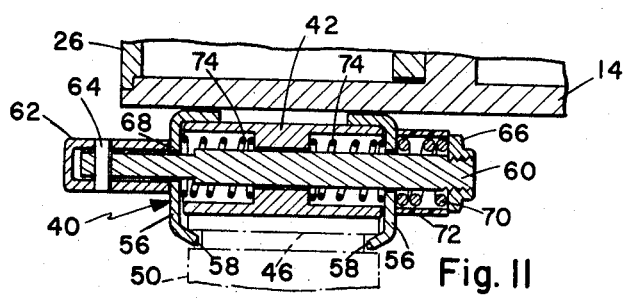
Fig. 11
INVENTOR.
WILLARD D. ISBELL
BY Carl R. Brown
ATTORNEY

FILM TRANSPORT UNIT

BACKGROUND OF THE INVENTION

In conventional film transport mechanism, particularly those for handling unperforated film, the film is usually gripped at one or more positions between pinch rollers to ensure a positive drive. When used in a microfilming operation, the film is advanced abruptly in single frame increments and, unless sufficient freedom is maintained in the supply and throughout the film path, damage or breakage of the film can occur. Loading the film in the mechanism is often complicated, since various spring-loaded rollers must be held back and the film threaded through restricted passages.

SUMMARY OF THE INVENTION

The film transport unit described herein has a very simple loading path, in which the film is essentially dropped into place without difficult threading. A continuously running supply motor maintains an ample supply loop of film by means of a slip-type drive which grips only the extreme edges of the film. Advancement of the film in single frame increments is made by a stepping motor driving a capstan, which grips the film only by the edges. The single pinch roller, used at the capstan, merely holds the film in driving contact and does not apply pressure to the face of the film. A lockout element holds the pinch roller clear of the film while loading and is quickly released when the access door of the unit is closed. The unit has quick-acting magazine-clamping means adaptable to a variety of standard film magazines, and various lens assemblies can be attached by conventional mounting means.

The primary object of this invention, therefore, is to provide a new and improved film transport unit.

Another object of this invention is to provide a new and improved film transport unit having drive means which will not damage the film and which permits a simple loading operation.

A further object of this invention is to provide a new and improved film transport unit particularly suitable for use as a microfilm camera, and which will accept various standard film magazines and lens assemblies.

Other objects and many advantages of this invention will become more apparent upon a reading of the following detailed description and an examination of the drawings, wherein like reference numerals designate like parts throughout.

BRIEF DESCRIPTION OF THE DRAWINGS

FIG. 3 is an enlarged side elevation view of the unit, partly sectioned and with the door removed.

FIG. 4 is a sectional view taken on line 4—4 of FIG. 3.

FIG. 5 is a sectional view taken on line 5—5 of FIG. 3.

FIG. 10 is a partial end view as taken from the right hand end of FIG. 3.

FIG. 11 is a sectional view taken on line 11—11 of FIG. 10.

FIG. 12 is an enlarged sectional view taken on line 12—12 of FIG. 1.

DESCRIPTION OF THE PREFERRED EMBODIMENT

Figure 1:
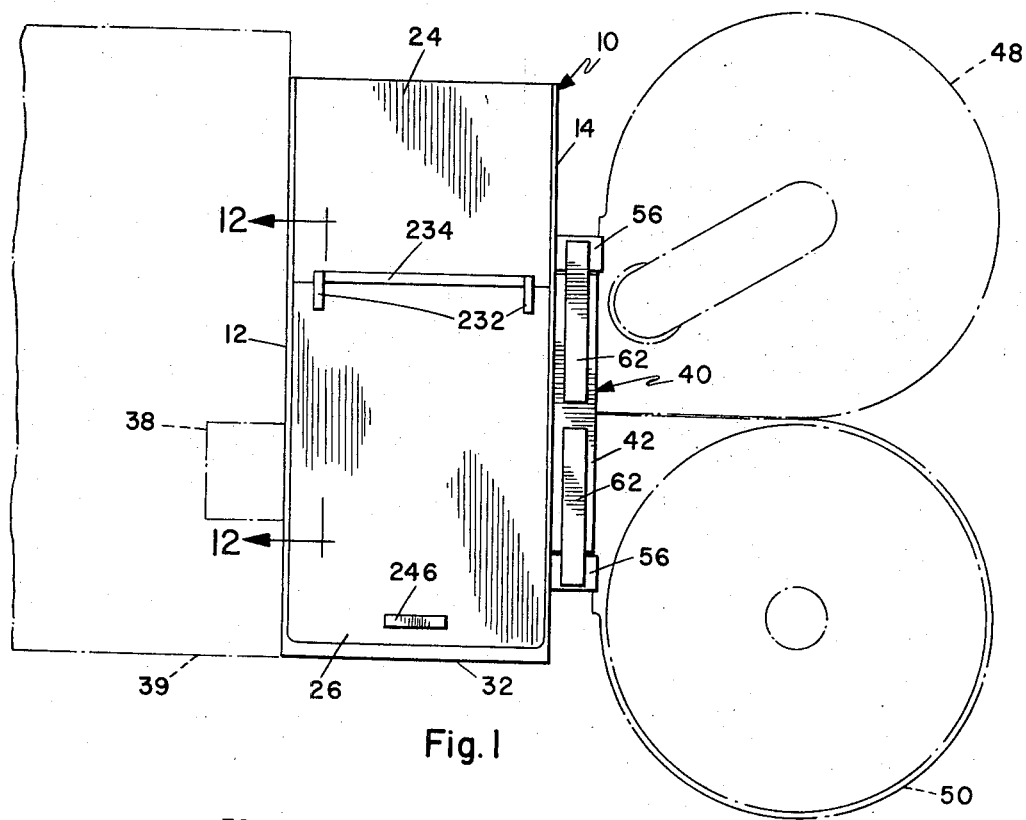
FIG. 1 is a side elevation view of the unit with magazine and a portion of a camera indicated in broken line.
Figure 2:
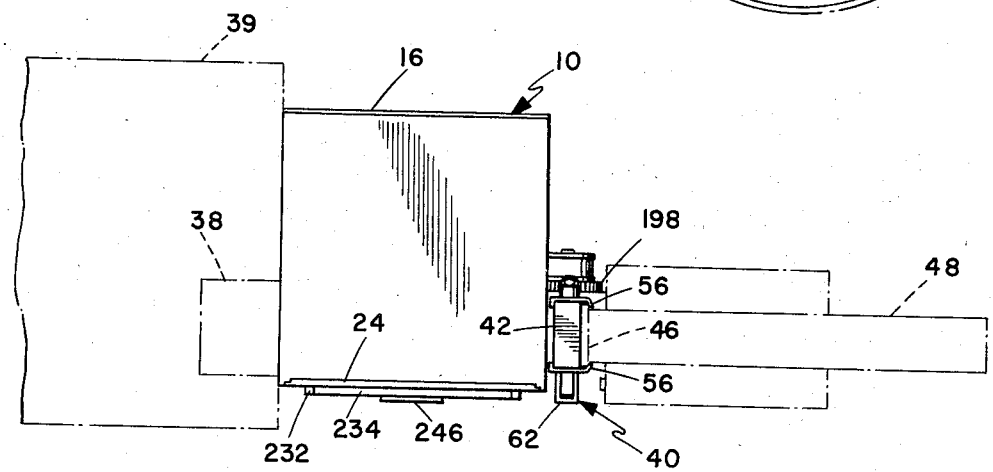
FIG. 2 is a top plan view of the structure.

The unit comprises a rectangular boxlike casing 10 having sides 12 and 14, the back being closed by a back panel 16. The casing is divided by a transverse wall 18 into an upper compartment 20 and a lower compartment 22, the upper compartment being closed by a front panel 24 and the lower compartment having an access door 26 hinged to the front panel. Access door 26 is made lighttight by a peripheral inset flange 28 and is held closed by any suitable catch means. The upper compartment 20 holds the electrical control and power supply means and a source of vacuum, all of which are conventional and not shown in detail.

In the casing 10 is a peripheral rib 30 extending on sides 12 and 14, wall 18 and the bottom panel 32, the rib being parallel to the place of access door 26 and providing support for a deck plate 34. The complete film-handling mechanism is mounted on deck plate 34, which is removably secured to rib 30 by any convenient means, the drive motors being enclosed in the compartment behind the deck plate.

Sidewall 12 has an aperture 36 to align with the lens 38 of a conventional microfilm display and camera apparatus 39, indicated in FIG. 1. Attachment means compatible with the camera structure is mounted on the casing as necessary. On sidewall 14 is a magazine mounting 40, comprising a block 42 with a vertically extending channel 44 to receive the attachment plates 46 of a supply magazine 48 and a takeup magazine 50. Several types of magazines have been standardized for microfilm, all having similar attachment means to fit existing cameras and film transport means. A typical magazine, particularly suitable for use with the present unit, is described in copending U.S. application Ser. No. 45,304, filed June 11, 1970 and entitled Microfilm Magazine. At the center of channel 44 is a retaining bar 52 having opposed notches 54 to receive the conventional lip portions of the magazine attachment plates. At the upper and lower ends of the block 42 are similar clamps, each comprising a pair of jaw elements 56 on opposite sides of the block, with inwardly turned clamp flanges 58 to grip the magazine attachment plate 46, as in FIG. 11. The jaw elements 56 are held together by a clamp pin 60 passing through block 42, one end of the pin having a toggle arm 62 pivotally attached thereto by a hinge pin 64, and the other end having a locknut 66. The toggle arm 62 has a cam face 68 which causes the jaw elements to be pulled together when the arm is folded along the side of block 42, a pressure spring 70 between the locknut 66 and the adjacent jaw element providing a controlled clamping pressure. A flexible boot 72 is fitted around spring 70 for protection. Recessed into block 42 are release springs 74 which force the jaw elements apart when the clamping pressure is released by swinging the toggle bar outwardly to the position shown in broken line in FIG. 10. Thus, each magazine is secured or released by a simple toggle action, rather than the clamp screw or threaded stud means commonly used. The clamps being capable of holding the screw-type Film from supply magazine 48 enters the unit through an inlet opening 76 through block 42 and sidewall 14, and returns to the takeup magazine 50 through a similar outlet opening 78. The openings 76 and 78 are circular in cross section to allow freedom in threading the film, without damage or scratches during operation.

Secured to deck plate 34 against sidewall 12 is an aperture block 80, having an exposure aperture 82 in registration with aperture 36. Adjacent the aperture block is a platen block 84, spaced to leave a narrow film channel 86 therebetween. For ease of servicing, the aperture block and platen block are secured to the deck plate 34 by manually operable captive screws 88, with alignment pins 90 used as necessary for accurate positioning. The platen block 84 has a film-supporting face 92, in which are small ports 94 opening into a vacuum chamber 96 in the block. A vacuum connection 98 extends through deck plate 34, with a hole 100 for connection to a conventional vacuum pump, now shown, in the upper compartment 20. The vacuum is controlled by a needle valve 102 in the block 84, to adjust the vacuum so that the film is held against face 92 but is able to slide freely for advancement.

Figure 6:
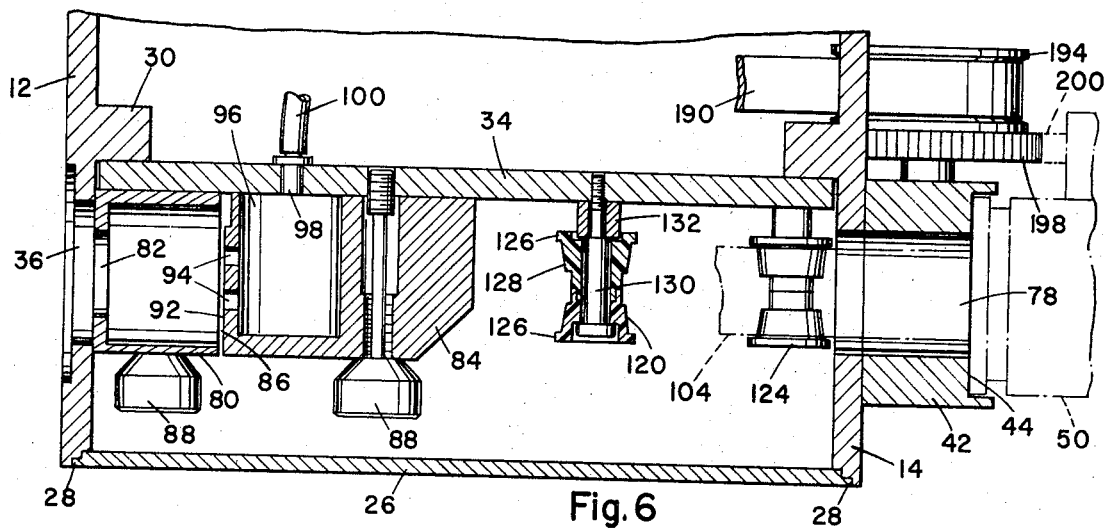
FIG. 6 is a sectional view taken on line 6—6 of FIG. 3.

The film 104 enters through inlet opening 76 and passes over a guide roller 106 immediately adjacent the inlet opening around a supply capstan 108, over a guide roller 110 and back in a return loop 112 to pass between staggered rollers 114 and 116 which align the film with the film channel 88. Below the platen block, the film passes around a drive capstan 118, upwardly over an idler roller 120, down around a tension roller 122 and back up over a guide roller 124 immediately adjacent the outlet opening 78, to return to the takeup magazine 50. The rollers 106, 110, 114, 116, 120, 122 and 124 are all basically similar and rotate freely. A typical structure is shown in the sectioned roller 120 in FIG. 6, in which the roller is made from two interfitting plastic portions, with side flanges 126 and an inwardly tapered body 128, so that the film is contacted only at the edges. The roller is mounted on a shaft pin 130 secured in deck plate 34 and spaced from the deck plate by a spacer 132.

Supply capstan 108 has side flanges with opposed inner faces 134 which converge radially inwardly each at a shallow angle to a plane perpendicular to the axis of rotation. The film fits between the flange faces so that only the extreme edges of the film are gripped. This type of pulley and its action are shown and described in copending U.S. application Ser. No. 45,412, filed June 11, 1970 and entitled Web Transport. With the film wrapped partially around the capstan, as in FIG. 3, a frictional driving contact will be maintained as long as there is tension in the film supply, causing the loop 112 to be formed. Above and bridging the pulleys 110 and 114 is an arcuate loop retainer 136, having a channel 138 with radially outwardly converging sides 140, to grip the film by the extreme edges in the manner of capstan 108, as indicated in FIG. 4. When the loop 112 is large enough to seat in the retainer channel 138, the resistance will cause the film to unseat from capstan 108 and stop the supply. As soon as the loop 112 is pulled free of the retainer by advancement of the film, the supply capstan will again grip the film and renew the loop. The supply capstan is thus driven by a continuously running supply motor 142 and maintains a proper supply loop without the need for the usual switch actuated intermittent type drive. Conventional antibacklash means may be incorporated in the drive of motor 142 to avoid unnecessary jerking of the film.

Figure 7:
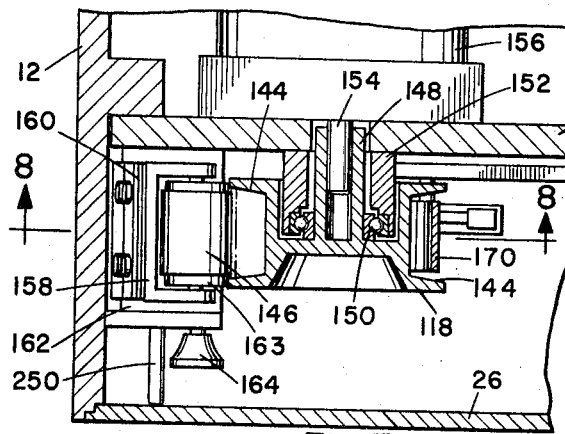
FIG. 7 is a sectional view taken on line 7—7 of FIG. 3.

The drive capstan 118 is similar to supply capstan 108, in that the edges of the film are gripped between inclined flange faces 144. To maintain a positive driving grip at all times, the film is held in place by a pinch roller 146, which merely keeps the film in edge-gripping contact with the drive capstan and does not apply any appreciable pressure to the film. The drive capstan has an axial sleeve portion 148 which is rotatable in a bearing 150 on a bearing post 152 extending from the deck plate 34, as in FIG. 7. Sleeve portion 148 is secured to the shaft 154 of a stepping motor 156, which rotates the drive capstan in extremely small but rapid incremental steps. The number of steps determines the distance of film advance for each frame, and is precisely controlled by conventional programming means incorporated in the microfilm camera.

Figure 9:
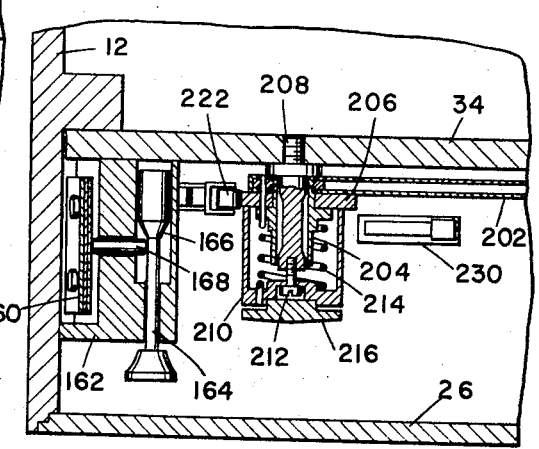
FIG. 9 is a sectional view taken on line 9—9 of FIG. 8.
Figure 8:
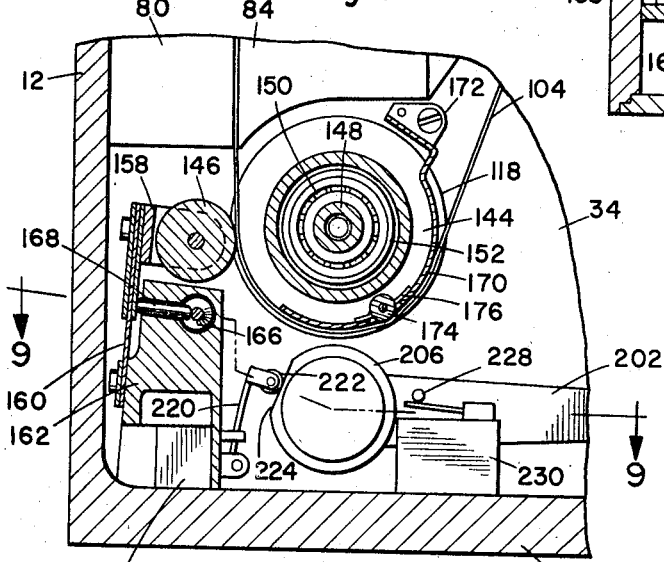
FIG. 8 is a sectional view taken on line 8—8 of FIG. 7.

The pinch roller 146 is freely rotatable in a bracket 158 attached to a leaf spring 160, which is mounted on a support block 162 on deck plate 34. Leaf spring 160 holds the pinch roller in contact with the capstan during operation. Penetration of pinch roller in the capstan is limited by the stepped roller design. The large center section positions the film to the proper depth in the capstan. The smaller diameter end sections 163 roll on the outer edges of the capstan controlling the depth of the roller center section. To facilitate loading the film, the pinch roller 146 is retracted by a lockpin 164 slidably mounted in the support block 162, and having a conical cam portion 166 which engages a plunger 168. The plunger projects through the support block and engages leaf spring 160, as in FIGS. 8 and 9. When lock pin 164 is pulled out, the cam portion 166 forces plunger 168 out and pushes the leaf spring away from the support block. When the film is loaded, the lockpin is pushed in, allowing leaf spring 160 to push plunger 168 in and drop the pinch roller onto the film.

To prevent the film from binding in the drive capstan, a resilient arcuate stripper blade 170 is fitted between the flanges, the blade having a free end adjacent the pinch roller 146 and being secured to deck plate 34 at the other end by a bracket 172. Near the center of stripper blade 170 is a separation roller 174, freely rotatable in bearings 176 and projecting outwardly through a slot 178 in the stripper blade, to break contact between the blade and the film.

At the position of idler roller 120 is a shutoff microswitch 180, the actuating arm 182 of which carries a roller 184 riding on film 104. When the end of the film passes, the roller 184 drops and the switch shuts off the film takeup drive in time to leave an end extending from the magazine. The takeup drive comprises a motor 186 mounted on the back of deck plate 34, with a pulley 188 driving a belt 190. The belt extends through an opening 192 in side 14 to a pulley 194 mounted on a shaft 196, which is fixed in block 42. Coupled to pulley 194 is a drive gear 198, which meshes with the existing gear 200 on the takeup magazine 50 when the magazine is locked in place.

Tension roller 122 is freely rotatably mounted on one end of a tension arm 202, the other end of which is pivotally attached to deck plate 34 adjacent support block 162. The tension arm is a lightweight element to minimize inertia and is fixed to a sleeve 204 together with a cam disc 206. Sleeve 204 is mounted on a bearing pin 208 projecting from deck plate 34, and is held in place by a cylindrical cover 210 secured by a screw 212 threaded into the bearing pin. The tension arm is biased downwardly by a torsion spring 214, having one end secured to the tension arm and the other end to cover 210. Bias force can be adjusted by rotating cover 210, the screw 212 being concealed by an end cap 216 plugged into the cover.

In the support block 162 is a takeup drive control switch 218 having an actuating arm 220 with a roller 222 which rides on the edge of cam disc 206. The cam disc has a flat portion 224 on which roller 222 rests when the tension arm 202 is down, as in full line in FIG. 3, this being the ON position of switch 218 and the takeup motor 186 being energized. If film is taken up without an equal length being advanced, the tension arm 202 will be raised, as in the broken line position in FIG. 3, causing cam disc 206 to push roller 222 back and actuate switch 218 to shut off the takeup motor 186. When more film is advanced, the slack allows tension arm 202 to drop and start the takeup motor. Cam disc 206 is designed to maintain a reasonable return loop from idler roller 120, around tension roller 122 and back to roller 124. An upper stop pin 226 is fixed in deck plate 34 to limit the upward travel of the tension arm.

If the takeup portion of the film jams and the slack allows the tension arm 202 to fall completely, a pin 228 projecting from the tension arm actuates a stop switch 230 to shut off stepping motor 156 and prevent further film advancement. The electrical wiring involved is simple and well known.

To facilitate loading of film in the unit, the access door 26 is provided with holding means for both the open and closed positions. As shown in FIG. 12, the door has hinge elements 232 which are pivotally connected to a hinge bar 234 fixed on front panel 24. Secured inside the door at one of the hinge elements is a bracket 236 having an arm 238 offset from the hinge axis. Fixed to deck plate 34 below the hinge is a socket member 240, and connected between the socket member and the end of offset arm 238 is a telescopic push rod 242 extended by a spring 244. In the full line position the spring is pushing up to hold the door closed. As the door is opened, the arm 238 passes over center past the hinge axis and the spring forces the door to the full open position shown in broken line. A suitable handle 246 is secured to the lower portion of access door 26.

For safety an interlock switch 248 is mounted in the support block 162 and is actuated by a pin 250, which extends to the OFF position when access door 26 is open, to shut off the power supply to the unit. When the door is closed, the pin 250 is pushed in and power is turned on.

It will be evident that the film transport unit is designed for ease of operation, in the attachment and removal of magazines and in loading the film. Damage to the film is minimized by the arrangement of drive and supply means which engage only the edges of the film, the mechanism as a whole having less parts than other such units.

Having described my invention, I now claim:

1. A film transport unit for attachment to a lens assembly for microfilm photography comprising:
a casing having a lighttight access door;
one side of said casing having an aperture for registration with the camera lens assembly;
the other side of said casing having clamp means for holding a film supply magazine and a film takeup magazine, with an inlet opening and an outlet opening extending through the casing for passage of film;
a deck plate mounted in said casing;
film-handling mechanism mounted on said deck plate, including a supply capstan adjacent said inlet opening, film guiding and supporting means at said aperture, and a drive capstan adjacent said supporting means;
said supply capstan being continuously driven and having opposed radially inwardly convergent flange faces for gripping opposite edges of the film;
guide rollers spaced from said supply capstan to hold the film around a substantial portion thereof;
said film guiding and supporting means including an aperture block and a platen block spaced to define a narrow film-guiding channel therebetween;
and said drive capstan having stepped drive means connected thereto for advancing film in single frame increments.

2. A film transport unit according to claim 1, wherein said drive capstan has opposed, radially inwardly convergent flange faces for gripping opposite edges of the film, and a pinch roller mounted adjacent said drive capstan and biased to hold the film in contact with said flanges.

3. A film transport unit according to claim 2, and including selectively operable lock means to hold said pinch roller clear of said drive capstan.

4. A film transport unit according to claim 2, and including an arcuate film stripping blade secured at one end to said deck plate and extending partially around said drive capstan inside the film path.

5. A film transport unit according to claim 4, and including a separation roller freely rotatably mounted on said stripping blade and projecting outwardly therefrom.

6. A film transport unit according to claim 2, and including a loop retaining member having an arcuate channel extending from adjacent said supply capstan toward said film guiding means, said channel having radially outwardly convergent sides for gripping the edges of a loop of film forced into the channel.

7. A film transport unit according to claim 1, wherein said platen block has a film supporting face, a chamber in said platen block with means for connection to a source of vacuum, and ports opening from said face into said chamber.

8. A film transport unit according to claim 7, and including vacuum control means in said platen block.

9. A film transport unit according to claim 1, wherein said inlet and outlet openings are circular in cross section.

10. A film transport unit according to claim 1, wherein said clamp means includes a block member having an elongated magazine receiving channel, pairs of jaw elements mounted on opposite ends of said block and having inwardly opposed clamp flanges to grip a magazine, and means for selectively closing and opening said jaw elements.

11. A film transport unit according to claim 10, wherein said last mentioned means comprises a clamp pin through each pair of jaw elements, an arm pivotally attached to one end of said pin and having a cam portion bearing on said block, and a spring mounted on the other end of said pin, biasing said jaw elements together.

12. A film transport unit according to claim 11, and including outwardly biased separation springs between said jaw elements.

13. A film transport unit according to claim 1, and including a film takeup motor mounted in said casing, with an external drive connection for engagement with the drive means of the takeup magazine, and control means for said takeup motor responsive to the advancement of film by said drive capstan.

14. A film transport unit according to claim 13, wherein said control means includes a tension arm pivotally mounted on said deck plate, a tension roller on said arm around which the film is looped between said drive capstan and said outlet opening, said tension arm being biased to hold a return loop in the film, and a switch actuated by motion of said tension arm to switch said takeup motor on and off.

* * * * *